Oct. 1, 1935.    J. V. MARTIN    2,016,095
ELASTIC TIRE
Filed May 7, 1931    2 Sheets-Sheet 1
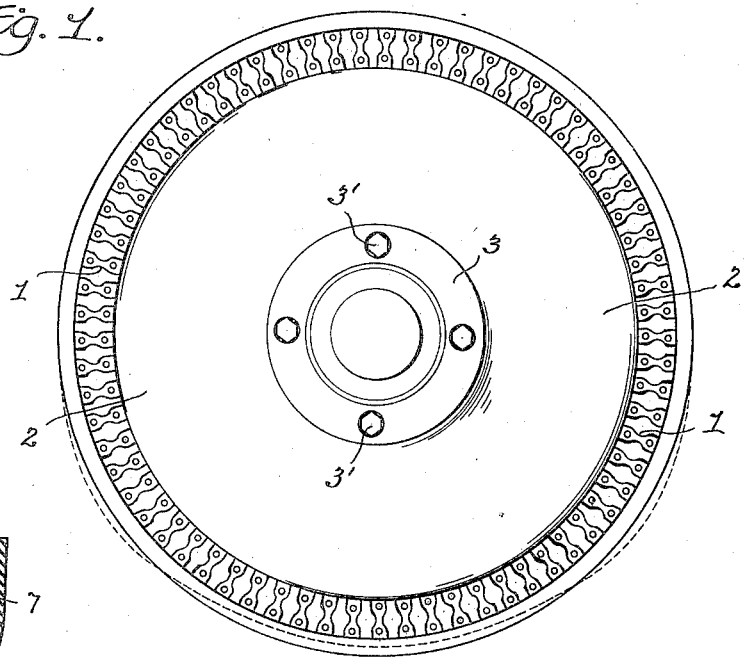
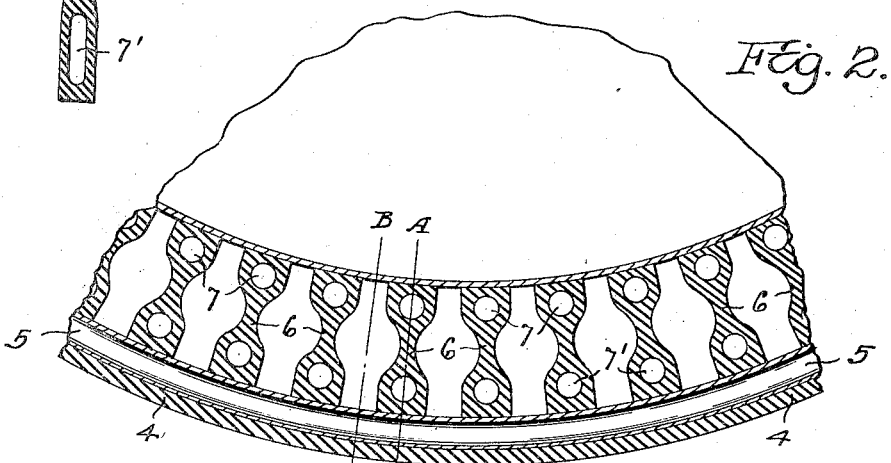
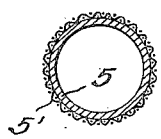
Inventor
James V. Martin Oct. 1, 1935.　　　J. V. MARTIN　　　2,016,095
ELASTIC TIRE
Filed May 7, 1931　　　2 Sheets-Sheet 2
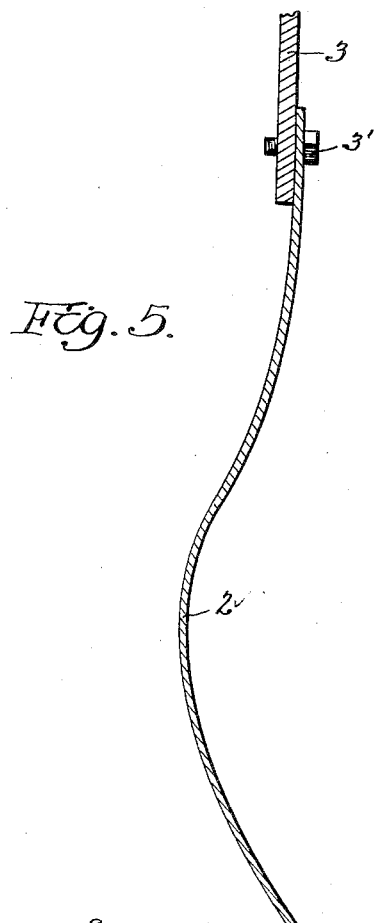
Fig. 5.
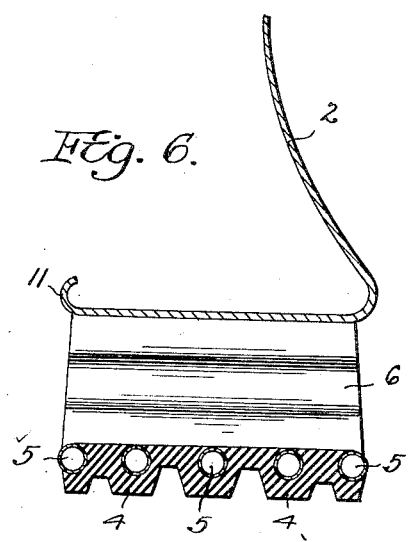
Fig. 6.
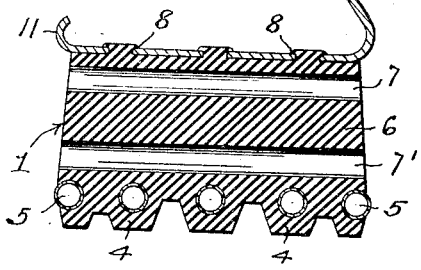
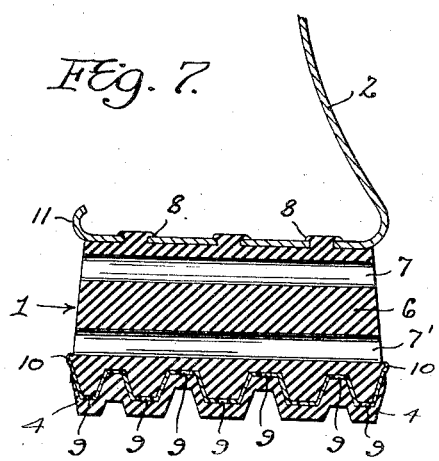
Fig. 7.
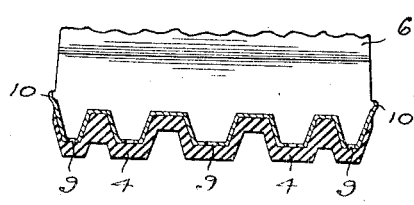
Fig. 8.
Inventor
James V. Martin Patented Oct. 1, 1935

2,016,095

UNITED STATES PATENT OFFICE 2,016,095

ELASTIC TIRE

James V. Martin, Martindale, Garden City, N. Y.

Application May 7, 1931, Serial No. 535,778

7 Claims. (Cl. 152—8)

My invention relates to tires for road vehicles or for aeroplanes and has for its primary object to provide a tire having an equivalent or greater cushioning than the conventional pneumatic type tire without the hazards due to air inflation and to combine, with the above, special features for the rapid radiation of heat away from the working rubber parts and withall, to afford a simple, dependable tire of light weight and easy manufacture.

There is an extensive art over many years showing efforts to provide a relatively soft tire which will support a vehicle wheel yieldably without depending upon air inflation and the flats resulting from punctures; most of these attempts have involved the use of sponge rubber fillers or of solid type tires perforated with holes to cool the rubber of which they are usually composed and to provide space for the ready displacement of the rubber. Such tires have met with a degree of success, but since they support the load by compression between the road and the axle they utilize, at any one time, but a small portion of the material in them is in use and are necessarily heavy, costly and develop so much heat at high speed as to be self destructive. I wish also to pay tribute to the work of James, #1,327,478; Pepple 1,365,539 and Couchois 1,256,877; none of these seem however, to have realized the importance of keeping the size of stiffening hoops down and their numbers up so as to increase the number of radial walls and to arrange these hoops in the plane of the tire ground contacting portion imbedded in rubber.

My present invention substitutes multiple rubber forms or spokes holding the load in tension from the upper half of a semi-flexible rim or tread portion and seeks to improve the former disclosures Patent Nos. 1,909,878 of May 16, 1933, and 1,954,214 of April 10, 1934.

In the accompanying drawings,

Fig. 1 shows my invention as it would appear mounted upon an axle.

Fig. 2 is an enlarged sectional view of a segment of the tire.

Fig. 3 shows in section one of the rubber forms stretched somewhat into the shape it will have when under maximum tensive load.

Fig. 4 is a cross sectional view of one of the small stiffening tubes used to make the tread portion capable of carrying the loads.

Fig. 5 is a sectional view in axial elevation of a wheel and my type of tire taken along the line A—A of Fig. 2.

Fig. 6 is a like view taken along the line B—B of Fig. 2.

Fig. 7 is a similar view to that of Fig. 5, but showing a form of flexible tread portion, and Fig. 8 is another sectional view of the said preferred construction taken along a line such as B—B of Fig. 2.

Referring now, to the more detailed explanation of my invention similar numerals will be used to indicate like parts throughout the several views:

1 indicates my invention or elastic tire attached by curing or vulcanization to a sheet metal disc type wheel 2, which is shown as demountably attached by bolts 3' to any type of vehicle hub 3.

A tread 4 is cured to stiffening hoops 5 made of very tough spring steel tubes of comparatively small diameter so that they can deform within desirable limits without crystallizing the metal of which they are made: The desirable degree of this deformation is indicated for maximum load conditions by a dotted arc on the lower part of Fig. 1. Rubber forms or spokes 6 are used to connect the said tread portion with the disk wheel 2 which is flanged into a rim having holes 8 in it to more firmly secure the bond of rubber and metal.

Where the form of corrugated and rolled sheet metal replaces the steel tube hoops to stiffen the tread portion, holes indicated at 9 in this tread stiffener also permit a more complete bond between the tread rubber 4 and the forms 6; a further reinforcement of the bond is secured by hooks or flanges 10 in the tread stiffener and similar flanges 11 serve to contact curbs and the like when the tire is in use on streets. It may be possible to perfect such a good bond between the metal and rubber that a fabric cover for the tubes 5 as indicated at 5' of Fig. 4 will be unnecessary and in that event the exposure of parts of the tubes as shown in Fig. 6 where the top of each tube is exposed between the spokes will help to cool the rubber tread. Each corrugation may be regarded as a stiffening hoop.

In operation my invention depends very little upon any compression support from the forms 6 where they intervene between the road contact and hub, but the vehicle load is carried by those forms located directly over the axle or hub and by all the forms along the circle located near the center of the hub and higher. The shape of the elastic forms as well as their proportions and quality is highly important, for example they are designed to give much movement in a vertical direction and almost none in a lateral direction also they move easily for an incipient torque, but very quickly build up resistance thereto, thus easing the initial drive and brake stresses on the mechanism and affording a gradual clutch action: The holes 7 and 7' are also designed to give added vertical movement to the tire and to keep down the thickness of rubber while affording a wide bond area for the rubber and metal particularly at the lateral margins of both the wheel and tire rims because it is the diagonal resistance of the web-like spokes which makes the tire strong laterally. Naturally, great strength must be had in the tread portion so that it does not deform too much in carrying the load around the circle from the road contact to the upper disc portion through the forms or web-like molded spokes which when stretched to maximum load will assume an elongated shape something like that indicated in Fig. 3.

To put the required strength in one hoop or tread portion produces so much stiffness and rigidity that the metal tends to hammer itself to pieces and crystallize, I have therefore distributed the strength in several hoops or in the form a corrugated sheet metal tread stiffener or flexible rim is used with the vertical depth of the corrugations adapted in their proportions to the diameter of the tire and to the number of spokes employed so that under maximum load the upper half of the tread portion will be held to an approximately true circular arc, but below the axle there will be an outward bulging of the tread portion on both sides of the road contact portion and at the ground contacting portion there will be an inward bulging or deformation of the arc as indicated in dotted lines in Fig. 1. There is a very close cooperation between the tire rim and the web spokes; the more numerous and the stronger the spokes the less the rim will deflect under load, and, as the rim may be proportionately very light (see Fig. 7), it is important that the spoke gives support to the rim entirely across its width. Because of the cooperation between spokes and rim I do not require a rim strong enough per se to support the load, nor any ability of the spokes to assume load in compression, also in practice it will be found that ⅔rds of all my spokes, because of the extreme flexibility of the rim work under load and most tension will be in those resisting the out-ward bulging of the rim shown in Fig. 1 in dotted lines. As it is contemplated that my spokes will buckle in their centers rather than accept compression loads, I have formed them so they will do this readily at their centers and left adequate spaces so the buckling spokes will not contact each other, see Figs. 1 and 2.

It will be evident from Fig. 5 that the rubber spoke is united with the tread rubber between the hoops, thus forming a sling of rubber around the outside of the hoops.

Having thus described my invention and the method of its operation, the invention consists in the above novel combinations as more particularly defined in the following claims:

I claim:

1. A tire and wheel combination wherein the wheel is yieldably suspended from the upper half of the said tire, the said tire including a tread portion having stiffening hoops cured thereto and elastic spokes to hold it in substantially circular form, each said spoke having an expanded portion with a hole therethrough located in the center of the spoke and adjacent said spoke's attachment to wheel and to said tread portion.

2. A tire including a full floating tread portion having multiple stiffening hoops yieldably spaced apart in substantially parallel planes by rubber and cured thereto, but being too weak and flexible to be practical unaided, elastic spokes holding the said portion against outward bulging within every sixty degree arc of the said portion the said spokes provided with expanded attachment ends and holes through the centers of each said ends.

3. A wheel and tire combination wherein web-like elastic spokes hold a reinforced rubber tread tire portion in lateral alignment with the said wheel, the said portion stiffened by three or more semi-flexible hoops, one edge of each said spoke provided with an expanded portion attaching to the inside of the said tire portion and a hole extending through the center of the said expanded portion of each spoke.

4. In a vehicle tire an elastic spoke having two oppositely disposed expanded attachment parts and a hole extending through the center of each said part.

5. A vehicle wheel and tire combination including a tire tread portion comprising elastic material and a plurality of circumferentially extending hoops of circular cross-section, multiple elastic spokes attached to said tread portion and supporting said wheel from the upper half of said tread portion, the elastic material of the said tread portion extending around each of the said hoops to form a union with the said spokes on both sides of each hoop.

6. A vehicle tire having elastic spokes and a tread portion including a centrally located hoop, a hoop located on each side of said first named hoop, the said hoops being of substantially circular cross-section and elastic means connecting each of said spokes to said hoops and forming a sling support surrounding each of the said hoops.

7. In a tire having a resilient tread the combination with a vehicle wheel of multiple tubular hoops of circular cross-section cured to the resilient material of the tire tread, elastic spokes attached to the said wheel, secured to the tread and supporting the said wheel in tension from the upper outside portions of the said hoops.

JAMES V. MARTIN.